United States Patent [19]
Remboski, Jr. et al.

[11] Patent Number: 5,099,683
[45] Date of Patent: Mar. 31, 1992

[54] METHOD AND APPARATUS FOR DETERMINING CERTAIN OPERATING AND RUNNING PARAMETERS IN AN INTERNAL COMBUSTION ENGINE

[75] Inventors: Donald J. Remboski, Jr., Northborough; Robert W. Law, Acton; Jialin Yang, Westboro, all of Mass.

[73] Assignee: Barrack Technology Limited, Perth, Australia

[21] Appl. No.: 527,049

[22] Filed: May 22, 1990

[51] Int. Cl.$^5$ .............................. G01L 23/16
[52] U.S. Cl. ........................................ 73/116
[58] Field of Search ............... 123/423, 435, 494, 426; 73/35, 116

[56] References Cited

U.S. PATENT DOCUMENTS

| | | | |
|---|---|---|---|
| 3,067,610 | 12/1962 | Bockewuehl et al. | 73/116 |
| 4,381,748 | 5/1983 | Eckert et al. | 123/414 |
| 4,444,169 | 4/1984 | Kirisawa et al. | 123/344 |
| 4,446,723 | 5/1984 | Böning et al. | 73/35 |
| 4,463,729 | 8/1984 | Bullis et al. | 123/478 |
| 4,779,455 | 10/1988 | Kuroiwa et al. | 73/116 |
| 4,887,574 | 12/1989 | Kuroiwa et al. | 123/425 |
| 4,919,099 | 4/1990 | Extance et al. | 123/425 |
| 4,930,478 | 6/1990 | Plee et al. | 123/425 |
| 4,940,033 | 7/1990 | Plee et al. | 1233/425 |

FOREIGN PATENT DOCUMENTS

| | | | |
|---|---|---|---|
| 60-17239 | 1/1985 | Japan | 123/425 |
| 89/11031 | 11/1989 | PCT Int'l Appl. | 123/425 |

OTHER PUBLICATIONS

R. A. Pinnock, P. Extance and C. P. Cockshott; Combustion Sensing Using Optical Fibres; 12-15 Oct. 1988.
Donald J. Remboski, Jr., Steven L. Plee, and Jay K. Martin; An Optical Sensor for Spark-Ignition, Engine Combustion Analysis and Control; Feb. 27, 1989.
Lucas Automotive, Gasoline Engine Systems Division; Adaptive Ignition Control (date unknown).
E. Day and b. J. Mehallick; Officially Measured Engine Timing (date unknown).
M. Takata, T. Ogawa, F. Kobayashi and S. Ikeda; Development of Optical Combustion Timing Sensor for a Diesel Engine (date unknown).
Vanzetti Systems, Inc.; Combustion Process Monitor for Automobile Engines and Instrumentation Proposal, May 31, 1978.

*Primary Examiner*—Andrew M. Dolinar
*Attorney, Agent, or Firm*—Harness, Dickey & Pierce

[57] ABSTRACT

An internal combustion engine having a luminosity detector and an arrangement for measuring certain operating and running parameters such as peak heat release rate in the combustion chamber, $NO_x$ emissions and air/fuel ratio is provided. An arrangement is also disclosed wherein the engine's adjustable parameters can be varied in response to the luminosity signal or in response to the measured operating parameters so as to provide better running of the engine and/or reduce cycle to cycle variation.

6 Claims, 12 Drawing Sheets

METHOD AND APPARATUS FOR DETERMINING CERTAIN OPERATING AND RUNNING PARAMETERS IN AN INTERNAL COMBUSTION ENGINE

BACKGROUND OF THE INVENTION

This invention relates to a method and apparatus for determining certain operating and running parameters in an internal combustion engine, and more particularly to an improved method and apparatus for determining the time in the combustion cycle at which peak rate of heat release occurs in the combustion chamber and for determining $NO_x$ emissions based on the detected luminosity in the combustion chamber of an engine This information can be then used for operating and controlling the engine.

With modern technology and electronics, many of the components and running conditions of an internal combustion engine can be controlled more accurately than with previously mechanical systems. For example, the control of the air/fuel ratio, spark timing, fuel injection timing and pulse, and other adjustable factors of engine operation are greatly facilitated through the use of electronic components and computers However, in order to accurately sense the running of the engine and the phenomena occurring within the combustion chamber, it is necessary to provide a sensor that is directly positioned within the combustion chamber or in proximity to it and which senses the actual combustion process in the engine It has been understood that knocking can be determined by an optical sensor that operates within the combustion chamber and which senses the luminosity of the gases in that chamber. A wide variety of knock detectors have been proposed that employ such sensors. However, the inventors have determined that detected luminosity in the combustion chamber, and in particular, various parameters of the luminosity signal or curve generated from this detected luminosity, can be used to predict the time at which the peak rate of heat release occurs in the combustion cycle and to predict $NO_x$ emissions from an internal combustion engine. These predictions were developed using a large bore, lean burn, highly boosted natural gas engine.

It is, therefore, a principal object of this invention to provide an improved apparatus and method for operating an engine, wherein a luminosity detector and particular parameters of its luminosity signal or curve are used to determine when peak rate of heat release occurs in the combustion chamber and to determine $NO_x$ emissions from the engine These predicted values can be determined during each cycle of operation, or an average value can be determined over a period of cycles.

It is a further object of this invention to provide an improved system and method for operating and controlling an engine, wherein the engine's adjustable parameters such as air/fuel ratio, spark timing, fuel injection, etc., can be varied in response to the parameters of the luminosity signal or in response to certain predicted operating and running parameters of the engine such as the time in the combustion cycle at which peak heat release rate occurs, air/fuel ratio or $NO_x$ emissions so as to provide better running of the engine and/or reduce cycle to cycle variation.

A type of engine sensor has been proposed that senses the actual luminosity of the gases within the combustion chamber. A wide variety of patents illustrating and describing the use of such sensors have issued including the following: 4,358,952; 4,369,748; 4,377,086; 4,393,687; 4,409,815; 4,412,446; 4,413,509; 4,419,212; 4,422,321; 4,422,323; 4,425,788; 4,468,949; 4,444,043; 4,515,132. For the most part, these patents disclose arrangements wherein the sensor is utilized to sense only total luminosity and to equate the luminosity signal to a knocking signal. However, as previously noted, the inventors have determined that this luminosity signal or curve, and in particular various parameters of that signal, can also be employed to determine particular phenomena occurring in the combustion chamber and as an engine control device.

SUMMARY OF THE INVENTION

This invention is adapted to be embodied in a method for operating an internal combustion engine and an apparatus therefor that has at least one combustion chamber and means for forming a combustible air/fuel mixture within the combustion chamber. In accordance with a first embodiment of the invention, the luminosity of gases in the combustion chamber are sensed or detected, a curve is generated based on the detected luminosity, the location, preferably in relation to crank angle, of a gain independent parameter on the luminosity curve is determined, such as location of peak luminosity, and the time in the combustion cycle at which peak heat release rate occurs is predicted, preferably in relation to crank angle, based on the determined location of the gain independent parameter. The locations of peak luminosity and peak heat release rate can also be used to estimate air/fuel ratio and $NO_x$ emissions.

Another feature of the invention is also adapted to be embodied in a method for operating an internal combustion engine and an apparatus therefor having at least one combustion chamber and means for forming a combustible air/fuel mixture within the combustion chamber. In accordance with this feature of the invention, the luminosity of the gases in the combustion chamber are detected, a curve is generated based on the detected luminosity, at least one parameter of the luminosity curve is determined, and $NO_x$ emissions are predicted based on the determination of at least one parameter.

DETAILED DESCRIPTION OF THE PREFERRED EMBODIMENTS

Figure 1:
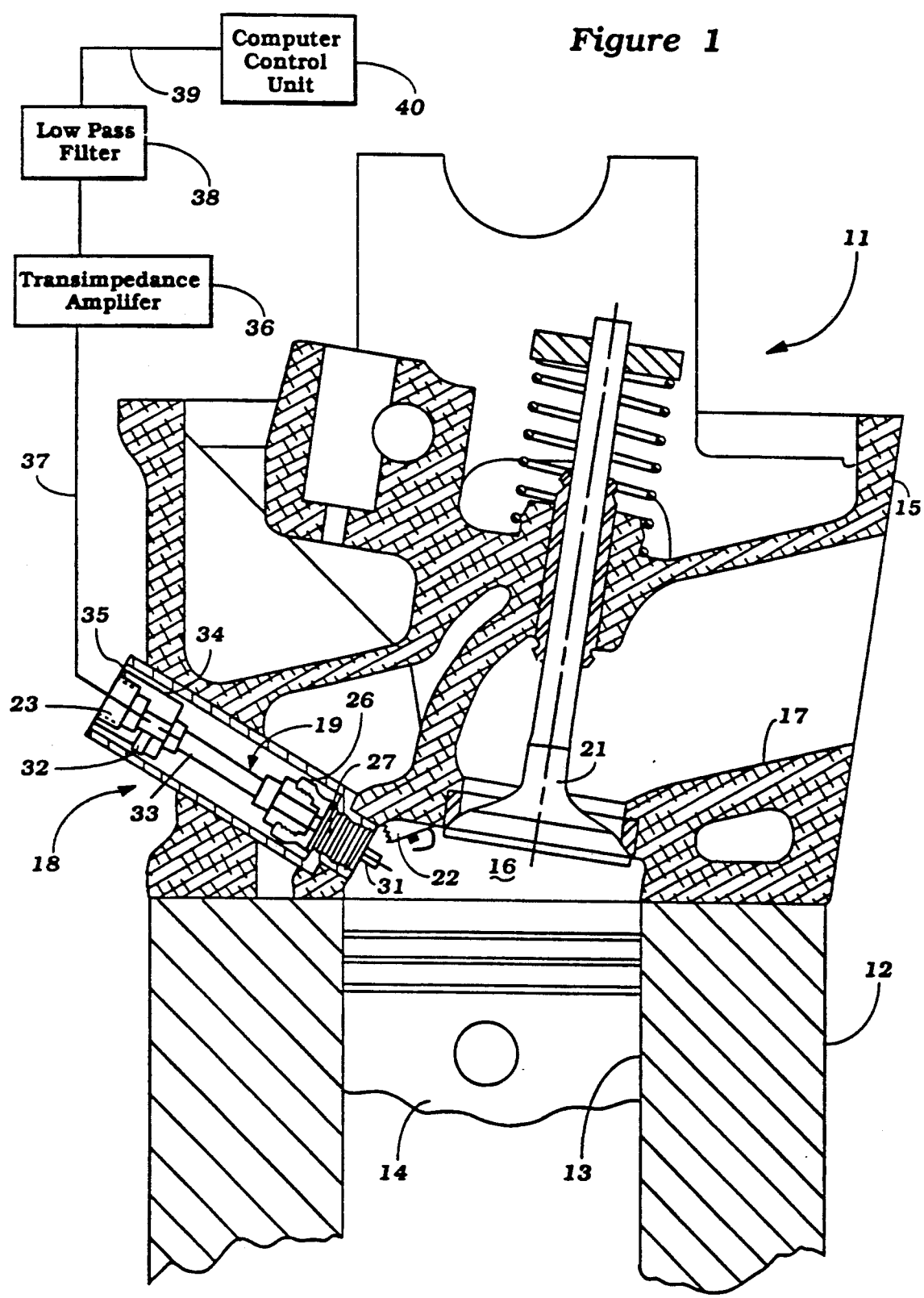
FIG. 1 illustrates a cross sectional view taken through a single combustion chamber of a multi-cylinder internal combustion engine constructed and operated in accordance with embodiments of the invention. This figure also illustrates a schematic diagram of the processing of the luminosity signal.

Referring to FIG. 1 of the drawings, a multi-cylinder internal combustion engine is identified generally by the reference numeral 11. It is to be understood that, although the invention has particular utility in multi-cylinder engines, certain facets of the invention may find application in single cylinder engines as well. Also, although the invention is described in conjunction with a reciprocating type engine, the principles of the invention may be utilized with engines of the non-reciprocating type, such as rotary engines, and with engines operating on either two-stroke or four-stroke cycles.

Inasmuch as the invention is concerned primarily with the combustion chamber and the conditions therein, only a cross sectional view taken through one of the combustion chambers is believed to be necessary to understand the environment in which the invention can be practiced. This cross sectional view shows a cylinder block 12 having a cylinder bore 13 in which a piston 14 is supported for reciprocation. The piston 14 is connected by means of a connecting rod (not shown) to a crankshaft (not shown) for providing output power from the engine 11.

A cylinder head 15 is affixed in a known manner to the cylinder block 12 and has a recess 16 which cooperates with the cylinder bore 13 and head of the piston 14 to provide a chamber of variable volume sometimes referred to hereinafter as the combustion chamber.

An intake port 17 and an exhaust port (not shown) extend through the cylinder head 15 and have their communication with the combustion chamber 16 controlled by poppet type intake valves 21 and exhaust valves (not shown) for admitting a charge to the combustion chambers 16 and for discharging the burnt charge from the combustion chamber 16. It is to be understood, of course, that the combustion chamber 16 may have a plurality of intake and exhaust valves, or may employ ports in lieu of valves, and that the engine 11 may include a plurality of combustion chambers 16.

The charge admitted to the combustion chamber 16 may comprise pure air or an air/fuel mixture that is formed by suitable charge former such as a port or throttle body type fuel injector, carburetor or gas admission valve. Alternatively, if pure air is delivered or injected into the chamber 16, direct cylinder or manifold injection may be employed for delivered or injecting fuel into the combustion chamber 16 to form the air/fuel mixture. The air/fuel ratio may be controlled in a variety of known manners such as by means of throttle valves, fuel control valves, injector pulse width, injection duration, injection timing, etc. Although an important feature of the invention is the predicted parameters under which the air/fuel ratio is controlled, the actual physical hardware for adjusting the air/fuel ratio is not part of the invention. However, in accordance with the invention, these various means mentioned above may be adjusted manually or automatically as part of an engine control loop so as to obtain the desired air/fuel ratio.

The engine 11 is preferably of the spark ignited type. However, the types of controls exercised and the nature of luminosity detecting may vary with different spark ignition engines. In an engine 11 of the spark ignited type, a spark plug 22 will be carried in the cylinder head 15 and have its gap exposed in the combustion chamber 16. The spark timing is controlled by a suitable mechanism which may be of any conventional type; however, the timing of the spark firing can be varied in accordance with parameters as hereinafter described.

As has been previously noted, the invention is capable of embodiment in a variety of conventional types of internal combustion engines and, for that reason, the details of the engine construction are not necessary to understand how the invention can be practiced by those of ordinary skill in the art.

However, in accordance with the invention, there is provided in the combustion chamber 16, a luminosity detector, indicated generally by the reference numeral 18. The luminosity detector 18 includes a threaded optic probe 19 or other type of optical access which extends through the cylinder head 15 and has its end terminating at or within the combustion chamber 16. The detector 18 and optic probe 19 may be of any suitable type, including the type described in the application entitled "Luminosity Detector", Ser. No. 467,883, filed Jan. 22, 1990, in the name of Donald J. Remboski, et al. and assigned to the Assignee of this invention. The disclosure of this application is incorporated herein by reference. Other suitable detectors and optic probes may also be used.

Figure 2:
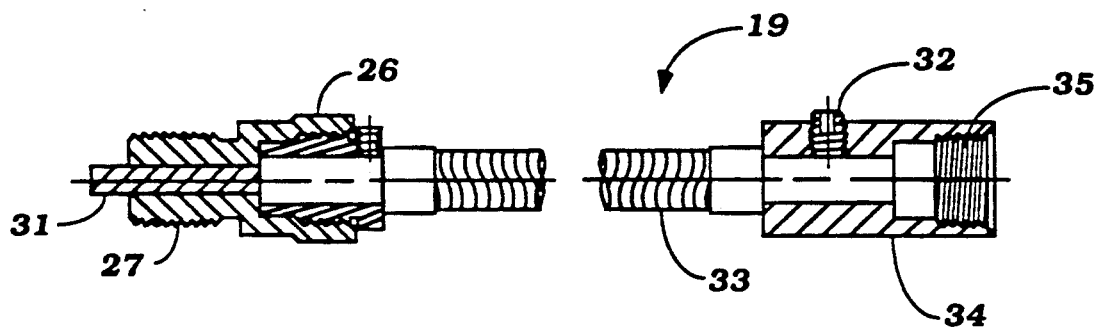
FIG. 2 shows a 10 mm threaded optic probe for use with this invention.

Referring to FIGS. 1 and 2, the illustrated probe 19 is comprised of a mounting housing 26 that has a threaded end 27 that is received within a threaded opening formed at the base of a counterbore that extends through the cylinder head 15 to the combustion chamber 16. The housing 26 may be formed from any suitable material, such as those materials normally used for the body of a spark plug.

An optic element 31 is affixed within the housing 26 in a suitable manner and has a portion that extends beyond the tip of the threaded end 27 so as to protrude into the combustion chamber 16 as shown in FIG. 1.

Light signals may be transferred from the optic element 31 through a fiber optic 33 that extends from the housing 26 into a housing 34 to a silicon photo detector 23 positioned within a threaded portion 35 of the probe 19. The fiber optic 33 is held in place by a set screw 32. Other arrangements may also be used where the silicon photo detector 23 is remotely positioned from the engine 11, in which case a fiber optic bundle can be used to conduct the light from the probe 19 to the remotely positioned detector 23.

The optic element 31 can be formed from a relatively inexpensive material such as synthetic sapphire ($Al_2O_3$) or other materials having similar characteristics. An optic element 31 having a diameter of 3 mm has been found to be practical and makes it relatively easy to install in the cylinder head 15.

Figure 3:
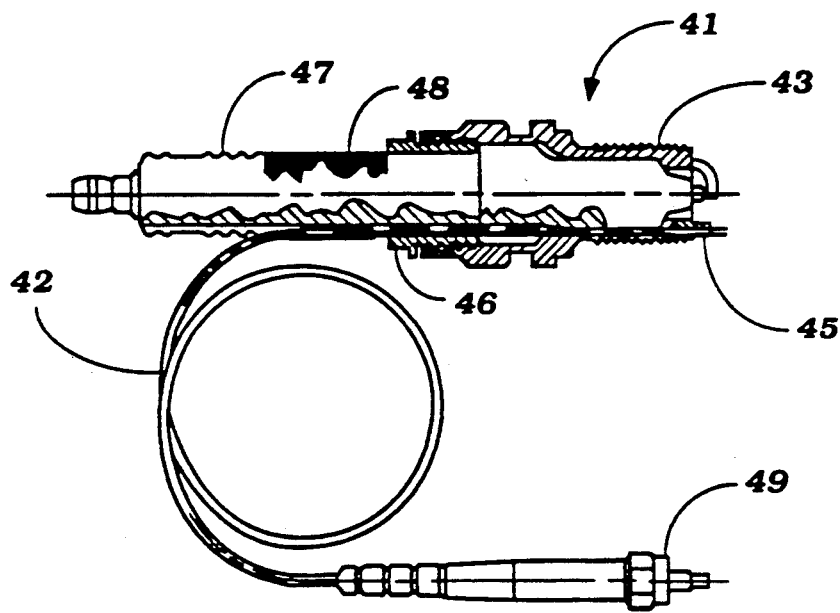
FIG. 3 shows a spark plug mounted probe for use with this invention.

In addition, a spark plug mounted probe 41, as shown in FIG. 3, may also be used instead of the detector 18, probe 19 and spark plug 22 shown in FIGS. 1 and 2. With this arrangement, light is collected by a sapphire window 45 and transmitted via a fiber optic cable 42 to the silicon photo detector 23. The spark plug mounted probe 41 further includes a base 43 adapted for threaded engagement with the cylinder head 15 of the engine 11. A gasket is provided for securely fitting the spark plug mounted probe 41 into the cylinder head 15. This base 43 has a hole drilled therein for housing the sapphire window 45 and a portion of the fiber optic cable 42. A clamping nut 46 is used to secure a spark plug ceramic and electrode 47 within the base 43. A cable strain relief 48 is provided to help prevent the fiber optic cable 42 from being disengaged from the spark plug mounted probe 41. A sub miniature applications (S.M.A.) type fiber optic connector 49 is used to connect the fiber optic cable 42 to the photo detector 23. In engines having a pre-chamber, this spark plug mounted probe 41 can be used in the pre-chamber and a separately installed luminosity detector 18 and probe 19 as previously described can be used in the main chamber.

The silicon photo detector 23 preferably has a peak spectral response at approximately 900 nm and is reversed biased to six volts to minimize noise and allow a temperature measurement of the detector 23. The silicon photo detector 23 converts the light received from the probe 19 or spark plug mounted probe 41 into a photo detector current.

Various luminosity spectra may be detected by the probe 19 and/or 41 and photo detector 23 or merely a total luminosity signal may be read. It has been found that certain constituents of the glowing gases in the combustion chamber 16 glow at different spectral ranges and this may be utilized to sense the amount and condition of such components in the combustion chamber 16 during each cycle of operation.

Depending on the particular gas or gases to be detected or sensed, it may be desirable to provide a monochromator or an optical filter in front of or on the silicon photo detector 23 so as to select a desired wavelength of light to be measured. For this application, the probe 19 is employed to measure the overall radiant emission from products of combustion in the near infrared region between 850 nm and 1000 nm. Thus, for this application, combustion radiation was filtered by an 850 nm long pass filter. This filter in combination with the silicon photo detector's long wavelength cut-off of approximately 1000 nm gives the system a band pass from 850 nm to 1000 nm. The near infrared region is monitored because it is not strongly influenced by radiant emission from the walls of the combustion chamber 16, nor is it sensitive to the emission from the flame surface. In addition, this particular wavelength band coincides with the peak spectral response of the silicon photo detector 23.

Figure 4:
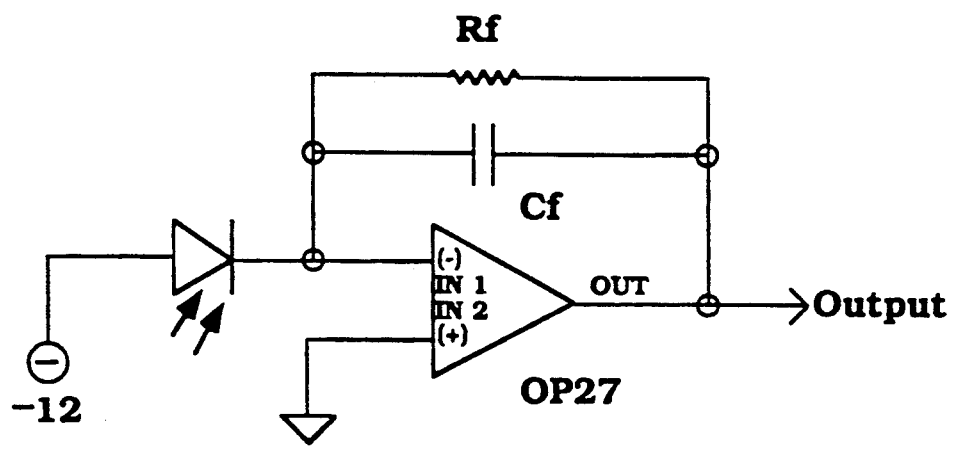
FIG. 4 is a circuit diagram of a transimpedance amplifier for use with this invention.

Referring again to FIG. 1, the silicon photo detector 23 outputs its signal to a transimpedance amplifier 36 via a cable 37 which should be adequately supported to minimize engine vibration coupled to the cable 37. This amplifier 36 is used to amplify the current from the photo detector 23 and to convert that current to a voltage signal. The circuit diagram of an amplifier 36 for use with this invention is shown in FIG. 4. A low pass non recursive filter 38 can be used to further reduce ignition and vibrational noise if necessary. The filter 38 has a passband ripple of less than 0.1 dB, a stopband attenuation of greater than 40 dB and a cutoff at 5% of the sampling frequency. In such an arrangement the output of the transimpedence amplifier 36 can be fed to the low pass filter 38 via a cable or other suitable conducting means for further filtering.

The low pass filter 38 then outputs its signal via conductors 39 to a computer control unit 40. In addition to converting the voltage signal from the transimpedence amplifier 36 and low pass filter 38 to an output indicative of luminosity, the remotely positioned control unit 40, which may measure certain engine parameters as well, may also receive input signals from other sensors normally employed on the engine, for example, air/fuel ratio, intake manifold pressure and temperature, engine speed and spark timing angle sensors. These types of sensors are normally employed with modern internal combustion engines and their signals can be processed in conjunction with the luminosity signal to provide certain measured characteristics of the engine operation. The remotely positioned control unit 40 may be of any suitable type and is particularly adapted to transmit the signal from the transimpedence amplifier 36 and low pass filter 38 into an output indicative of luminosity within the combustion chamber 16.

Figure 5:
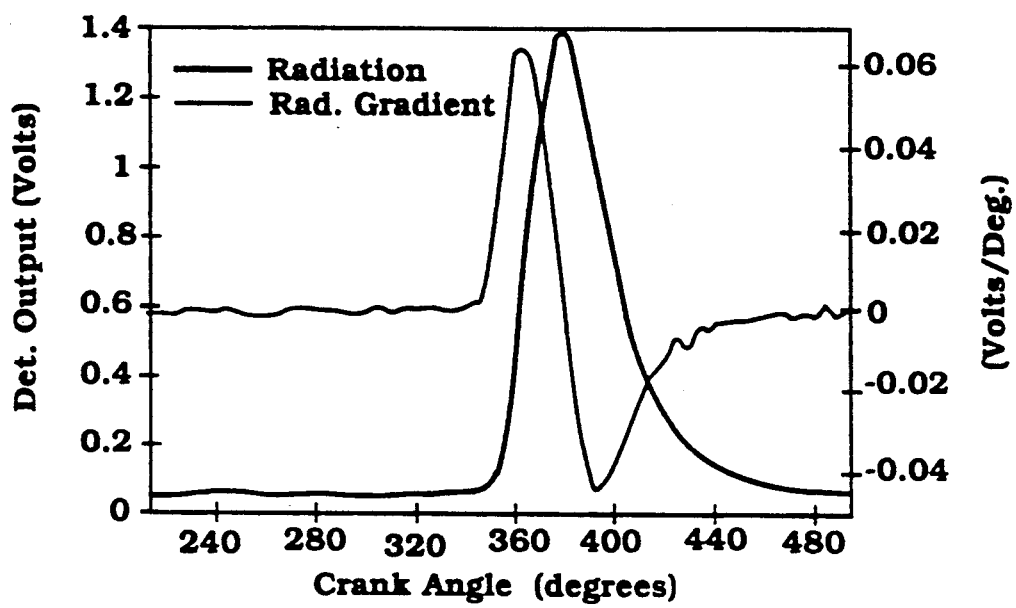
FIG. 5 shows a filtered mean radiation trace or luminosity curve measured in volts plotted against crank angle and its gradient or derivative measured in volts/degrees, also plotted against crank angle.

A typical filtered mean radiation trace or luminosity curve measured in volts, and its gradient or derivative measured in volts/degree, both plotted against crank angle, are shown in FIG. 5. The measurement of the luminosity curve and the location of its various gain independent parameters in relation to crank angle assumes a reciprocating type engine In non-reciprocating engines these measurements can be done in relation to output shaft angle. These measurements can also be done in relation to any timing indicator which gives an indication of time in the combustion cycle.

It has been determined that the time in the combustion cycle at which peak heat release rate occurs, and $NO_x$ emissions can be predicted using the luminosity detector 18 and/or the spark plug mounted probe 41 and the luminosity curve generated as a result of the detected luminosity in the combustion chamber 16 employed to adjust various parameters of the engine to obtain optimum performance.

Some of the luminosity parameters used, such as location of peak luminosity, are gain independent which means that they are not affected by variations in the gain of the signal which may decrease over time due to deposits forming on the probe 19 or sapphire window 45. As previously noted, gain independent luminosity parameters are typically measured in terms of time in the combustion cycle, which can be expressed as a location in crank angle degrees, instead of amplitude of the signal. Thus, as long as the luminosity signal maintains a sufficient signal to noise ratio, the location in crank angle degrees of a particular gain independent luminosity parameter, will remain the same regardless of gain changes in the signal.

Data for the relationships and correlations set forth below were obtained using a single cylinder of a 69 liter, carbureted, spark ignited engine, natural gas engine having a compression ratio of 11.0, a bore of 170 mm, a crank radius of 95 mm, a stroke of 190 mm, and four valves per cylinder. The data was also obtained under various engine speeds (1200, 1350 and 1500 rpm), lean air/fuel ratios and spark timing (21, 24, 27 degrees before top dead center). The load measured in percent rated torque was varied between 50, 75 and 100. The engine was also run under different water jacket temperatures of 190° F., 210° F. and 230° F. Spark plug gaps 0.015", 0.020" and 0.025" were used.

Figure 6:
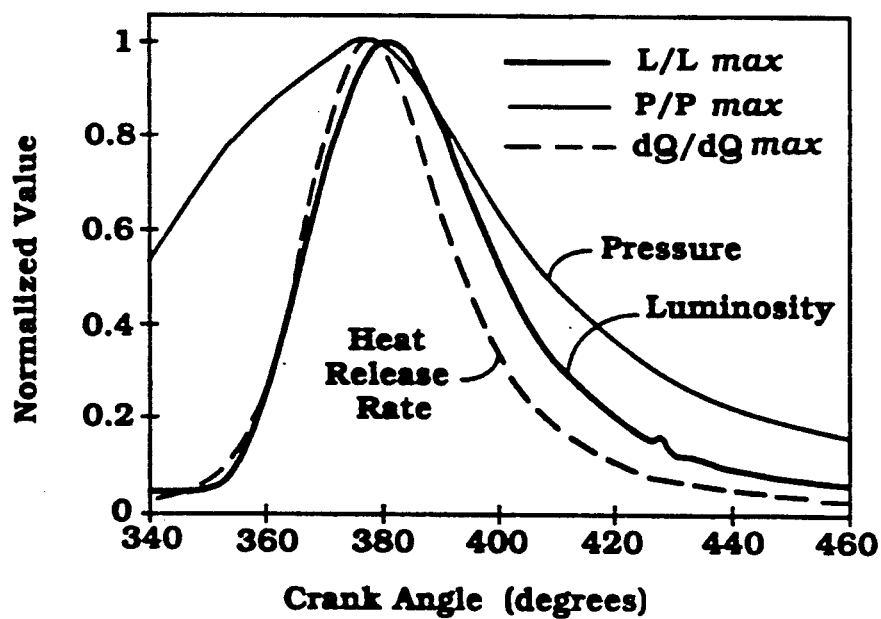
FIG. 6 shows 100 cycle ensemble average luminosity (radiation), pressure and heat release rate curves.

FIG. 6 shows 100 cycle ensemble average luminosity (radiation), pressure and heat release rate curves for a typical run condition. A normalized value is used for comparison. The pressure and heat release rate curves were generated using a water cooled pressure transducer. Heat release data was obtained from a single zone thermodynamic model. The relationship between pressure and luminosity is similar to that observed in a stoichiometric passenger car engine in that the peak pressure leads peak luminosity by a few crank angle degrees. As the figure indicates, peak heat release rate also leads peak luminosity. This is also the case in auto engines; however, in the auto engine peak heat release rate leads peak luminosity by a greater margin, reflecting the slower burn needed to minimize $NO_x$ production.

Figure 7:
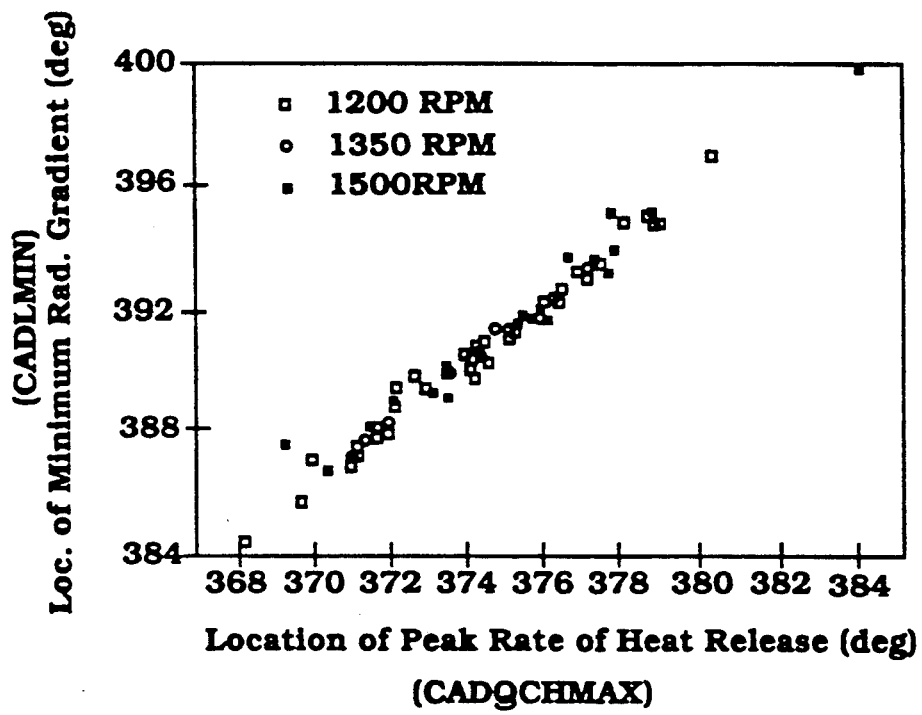
FIG. 7 depicts the relationship between the location of minimum luminosity derivative (location of minimum radiation gradient) and location of peak heat release rate both measured in crank angle degrees for different engine speeds.
Figure 8:
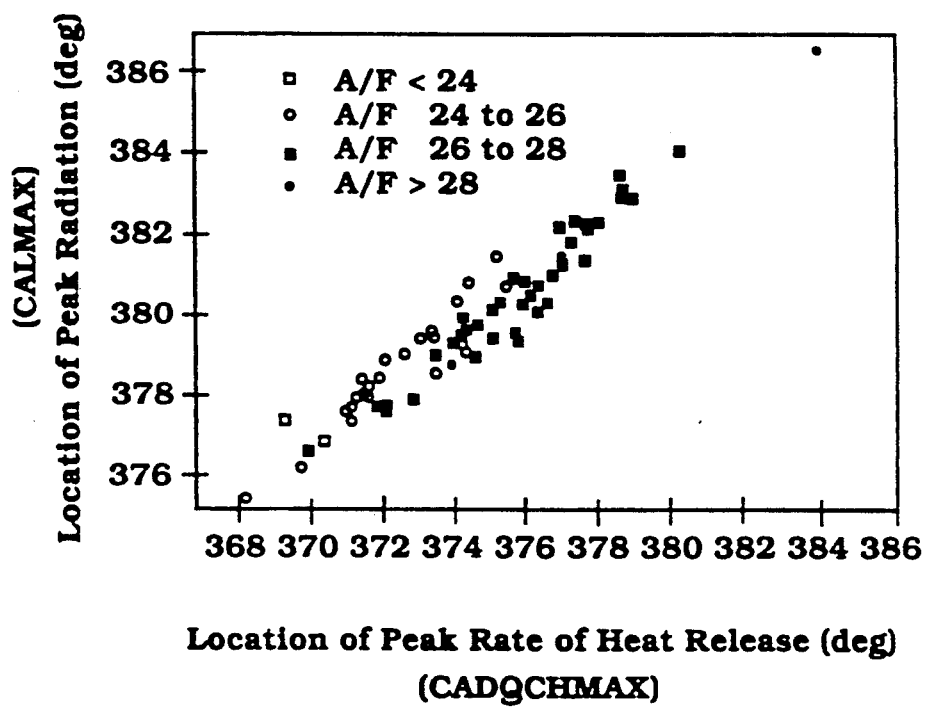
FIG. 8 shows the relationship between location of peak luminosity or radiation and location of peak heat release rate both measured in crank angle degrees for different air/fuel ratios.

FIGS. 7 and 8 show two gain independent luminosity parameters which are effective in predicting the location in crank angle degrees of peak heat release rate (CADQCHMAX). FIG. 7 shows that the location in crank angle degrees of minimum radiation gradient or minimum luminosity derivative (CADLMIN) can be used to predict CADQCHMAX within +/− one (1) crank angle degree. As FIG. 7 illustrates, the trend between these two parameters is linear with a linear correlation of 0.99. The data points are grouped according to engine speeds of 1200, 1350 and 1500 rpm.

FIG. 8 shows the relationship between location in crank angle degrees of peak radiation or luminosity (CALMAX) and CADQCHMAX. CALMAX can be used to predict CADQCHMAX within +/− two (2) degrees. The trend is generally linear with a linear correlation of 0.96. The data is grouped by air/fuel ratio (A/F), and as can be seen, this trend improves if air/fuel ratio is taken into account. The measurements are in crank angle degrees in the preferred embodiment, although as previously noted, these measurements can be based on other indicators which provide an indication of time in the combustion cycle.

Figure 9:
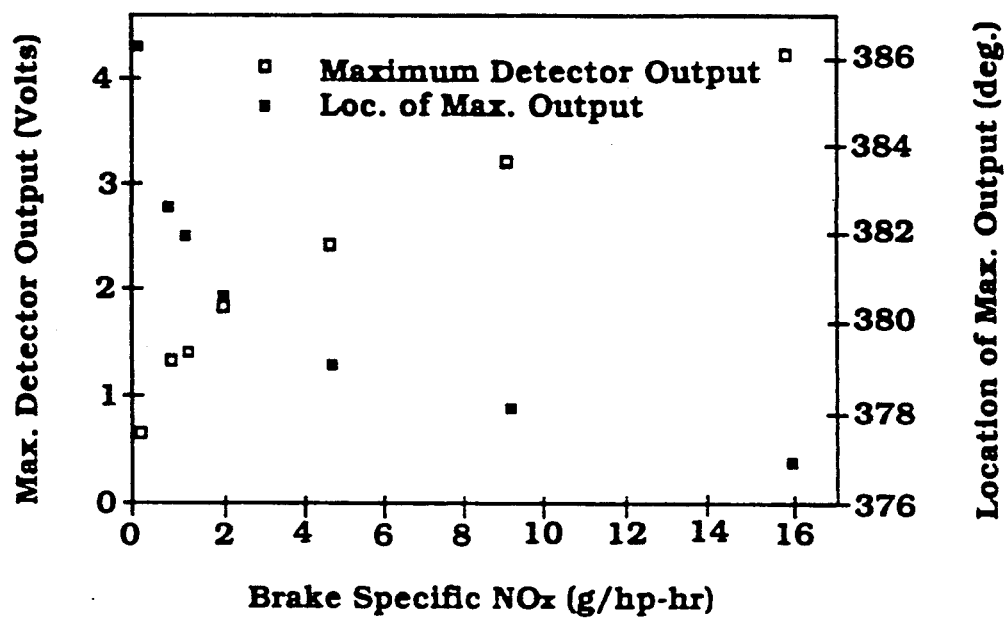
FIG. 9 shows a comparison of peak luminosity (maximum detector output) and location of peak luminosity or maximum output in crank angle degrees verses brake specific $NO_x$.
Figure 10:
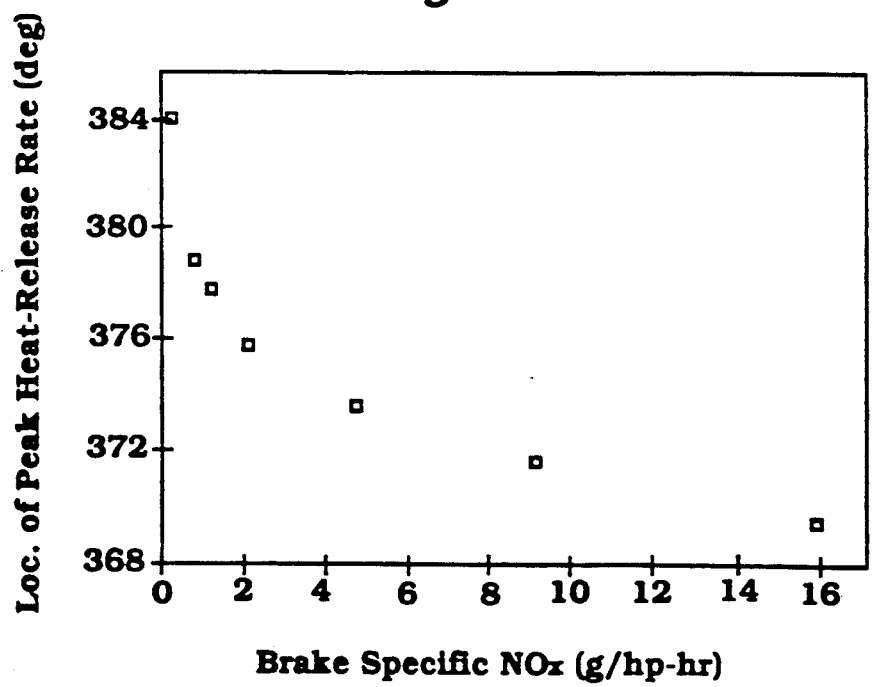
FIG. 10 shows the location of peak heat release rate in crank angle degrees versus brake specific $NO_x$.

FIG. 9 shows the relationship of maximum detector output or peak luminosity and location in crank angle degrees of maximum detector output or peak luminosity vs. brake specific $NO_x$ measured in g/hp-hr with the engine running at 1500 rpm and 100% load. $NO_x$ is reduced at constant torque by increasing air/fuel ratio and increasing intake pressure, that is, running leaner at higher pressure. Thus, for the data shown, the air/fuel ratio is lowest and the intake pressure is lowest at the highest $NO_x$ condition. It has been shown that peak luminosity increases with both decreasing air/fuel ratio and increasing intake pressure. Thus, the drop in peak luminosity at lower levels of $NO_x$ indicates that the change in air/fuel ratio had a stronger effect than the increase in intake pressure. The location of peak luminosity retards with decreasing $NO_x$, as shown in FIG. 9, as does the location of peak rate of heat release, as shown in FIG. 10. FIG. 10 shows the relationship between location of peak heat release rate in crank angle degrees and brake specific $NO_x$.

Empirical correlations have also been developed by the inventors which use luminosity parameters in combination with various engine operating parameters such as engine speed in rpm, spark timing in crank angle degrees, intake manifold pressure in kPa, intake air temperature in degrees Celsius, coolant temperature in degrees Celsius, and air/fuel ratio to predict $NO_x$ emissions. These empirical correlations were established using a curve fitting routine which performs a multiple regression analysis using a quadratic response surface model for the function: $Y = A + B_1X_x + \ldots + B_nX_n + C_{1,2}(X_1X_2) + C_{1,3}(X_1X_3) + \ldots + D_1X_1^2 + D_2X_2^2 + \ldots + D_nX_n^2$. The routine calculates regression coefficients for linear, cross product and squared terms. $X_1$ through $X_n$ represent the selected luminosity and engine operating parameters. The various A, B, C and D terms are curve fitting parameters generated in response to the luminosity and engine parameter data set to generate a curve fit. Each data point in the following correlations represents a 100 cycle ensemble average. The predicted values for $NO_x$ emissions determined by the quadratic model were compared with measured values determined by an emissions bench.

Figure 11:
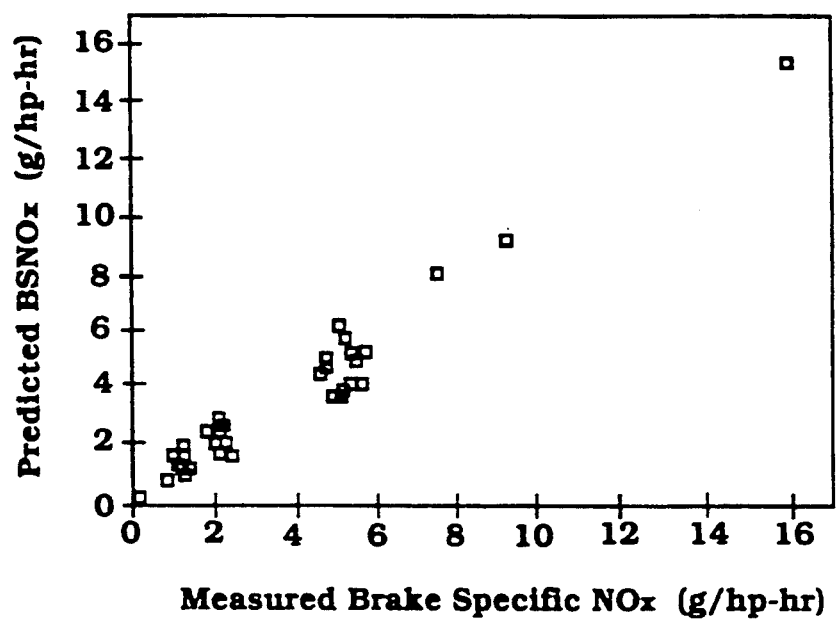
FIG. 11 shows the correlation between measured and predicted brake specific $NO_x$ using intake pressure, air/fuel ratio and location of minimum luminosity derivative to determine the predicted values.

A comparison between predicted and measured brake specific $NO_x$ (BSNO$_x$) values is shown in FIG. 11. The predicted values were calculated using intake pressure, air/fuel ratio and location in crank angle degrees of minimum luminosity derivative (minimum radiation gradient) as variables in the quadratic model. The correlation has an R-squared value of 0.93 and a standard deviation of residuals (S.D.R.) of 1.28 g/hp-hr.

Figure 12:
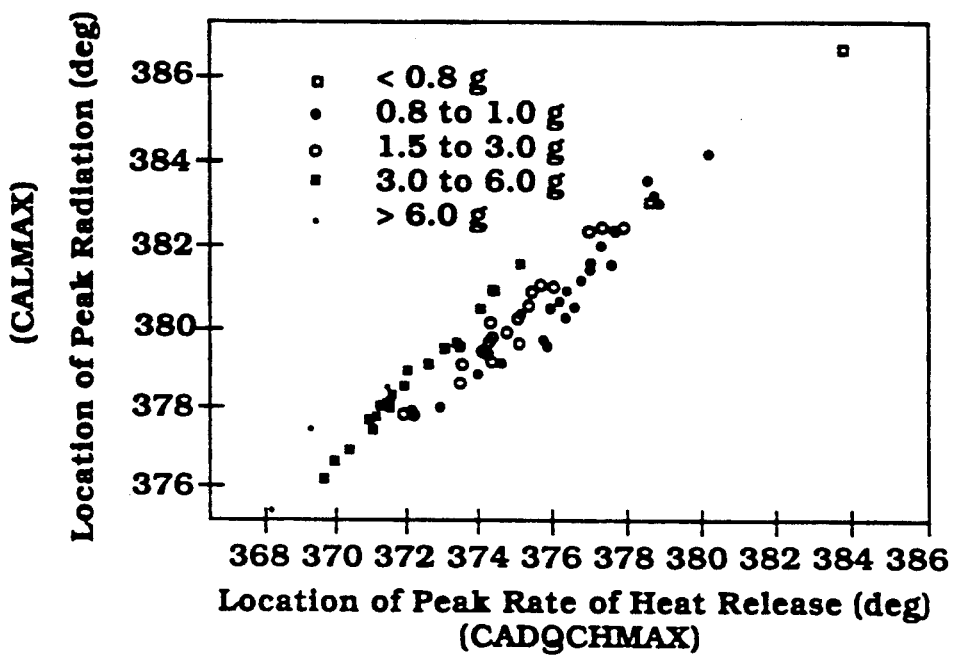
FIG. 12 shows the relationship between the location of peak luminosity and location of peak heat release rate both measured in crank angle degrees for different brake specific $NO_x$.

FIG. 12 shows the same data as FIG. 8 only sorted by brake specific $N_x$. As can be seen, lines of constant $N_x$ level result which are similar to the lines of constant air/fuel ratio shown in FIG. 8. FIG. 12 also shows that for a given location of peak heat release rate (CADQCHMAX), a higher level of $NO_x$ is indicated by a later location of peak luminosity (CALMAX). Thus, the phase shift between location of peak luminosity and location of peak rate of heat release can be used to give an estimate of $NO_x$ emissions and air/fuel ratio.

Figure 13:
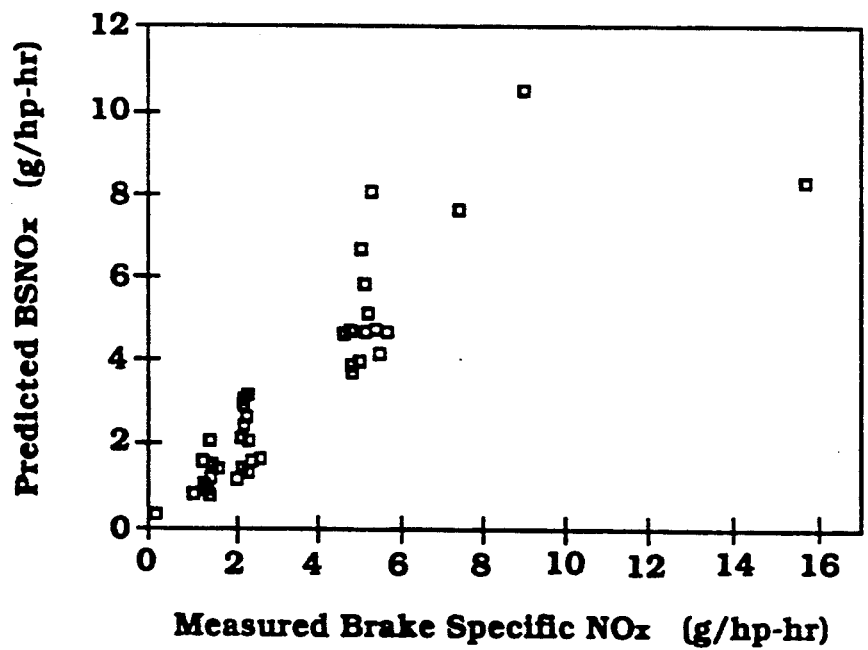
FIG. 13 shows the correlation between measured and predicted brake specific $NO_x$ using intake pressure, location of peak luminosity and location of minimum luminosity derivative to determine the predicted values.

Using the relationship between location of peak rate of heat release and location of peak luminosity shown in FIG. 8, the inventors have determined that the air/fuel ratio variable in the quadratic model used in FIG. 11 can be replaced with location of peak luminosity. FIG. 13 shows the correlation between predicted brake specific $NO_x$ emissions, using intake pressure, location of peak luminosity and location of minimum luminosity derivative as variables in the aforementioned quadratic model, and measured brake specific $NO_x$. As FIG. 13 shows, good correlation between measured and predicted values was obtained. The R-squared value for this correlation is 0.87 and the standard deviation of residuals is 1.35 g/hp-hr. The measured values were determined using an emissions bench.

Figure 14:
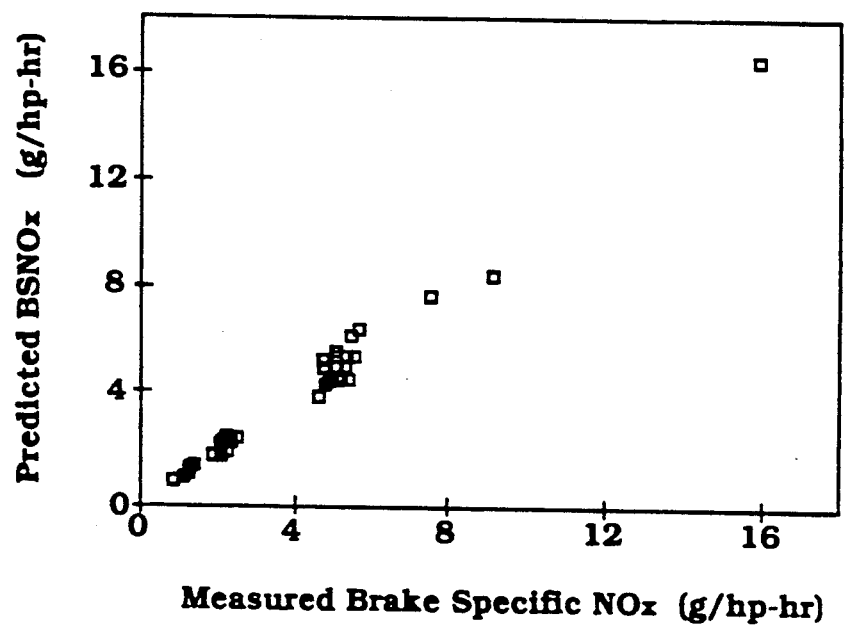
FIG. 14 shows the correlation between measured and predicted brake specific $NO_x$ using various luminosity parameters to determine the predicted values.

The correlation shown in FIG. 13 can be further improved by including the following variables in the quadratic model: engine speed, intake air temperature, coolant temperature, intake pressure, location of peak luminosity in crank angle degrees, the phase difference between location of peak luminosity and spark timing in crank angle degrees, the x-coordinate of the centroid of the luminosity signal in crank angle degrees ($X_{cp}$), the normalized y-coordinate of the centroid of the luminosity signal against peak luminosity, the normalized second moment about $X_{cp}$ of the luminosity signal against peak luminosity and the normalized third moment about $X_{cp}$ of the luminosity signal against peak luminosity. The correlation between predicted brake specific $NO_x$ emissions using these variables in the quadratic model and measured brake specific $NO_x$ determined by an emissions bench is shown in FIG. 14. This comparison was generated using a reduced set of linear, cross product and squared terms in the quadratic model. The R-squared value for this correlation is 0.99 and the S.D.R. is 0.30g/hp-hr.

Figure 15:
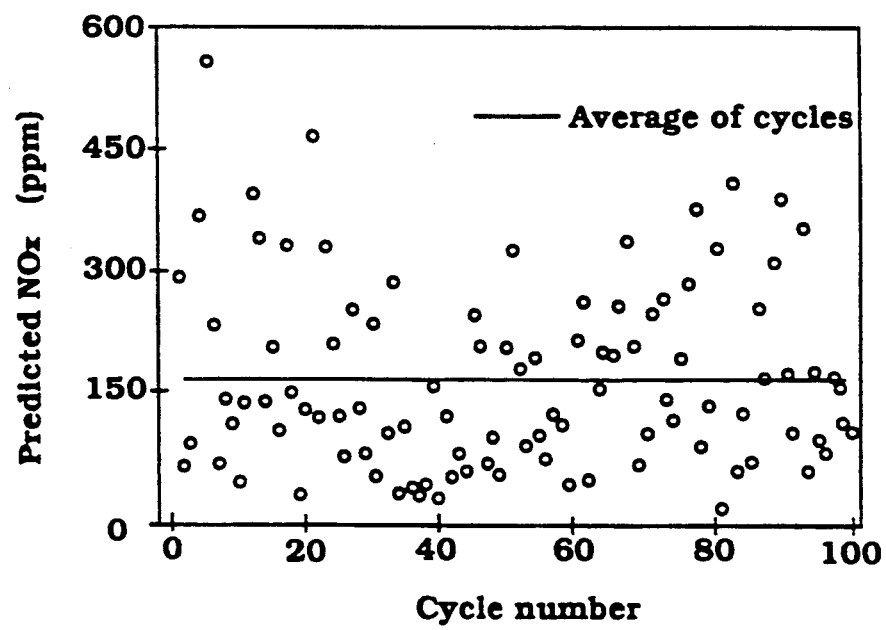
FIG. 15 shows individual cycle $NO_x$ estimates for 100 consecutive cycles.

FIG. 15 illustrates the cyclic variability problem associated with $NO_x$ emissions. Individual cycle $NO_x$ predicted values are shown for 100 consecutive cycles. As can be seen, a small number of cycles produce most of the $NO_x$. It is therefore desirable that the $NO_x$ emissions be predicted on a cycle to cycle basis so as to reduce this variability. The predictions developed by the inventors can be made on a cycle to cycle basis.

It should be readily apparent that the use of the luminosity signal or curve, and in particular various parameters of that curve, are extremely effective in predicting the time in the combustion cycle at which peak rate of heat release occurs and for predicting $NO_x$ emissions. Those skilled in the art and armed with this knowledge should be able to provide various engine controls such as the timing of the spark ignition, and timing and duration of fuel injection, or changing of air/fuel ratios through premixing devices such as carburetors or port injectors so as to obtain optimum performance in response to the predicted values for location of peak rate of heat release and $NO_x$ emissions. These control systems could also be used to reduce fuel consumption.

The foregoing description is that of preferred embodiments of the invention and various changes and modifications may be made without departing from the spirit and scope of the invention as defined by the appended claims.

We claim:

1. A method for operating an internal combustion engine having at least one combustion chamber, means for forming a combustible air/fuel mixture within the combustion chamber, means for detecting the luminosity within the combustion chamber, generating a curve based on the detected luminosity, determining the location of peak luminosity on the luminosity curve, predicting the time in the combustion cycle at which peak heat release rate occurs based on the determined location of peak luminosity, and estimating air/fuel ratio based on the relationship between location of peak luminosity and the predicted time in the combustion cycle at which peak heat release rate occurs.

2. A method for operating an internal combustion engine as recited in claim 1, wherein the predicted time in the combustion cycle at which peak heat release rate occurs is determined in relation to crank angle.

3. A method for operating an internal combustion engine having at least one combustion chamber, means for forming a combustible air/fuel mixture within the combustion chamber, means for detecting the luminosity within the combustion chamber, means for detecting the luminosity within the combustion chamber, generating a curve based on the detected luminosity, determining the location of peak luminosity on the luminosity curve, predicting the time in the combustion cycle at which peak heat release rate occurs based on the determined location of peak luminosity, and estimating $NO_x$ emissions based on the relationship between location of peak luminosity and the predicted time in the combustion cycle at which peak heat release rate occurs.

4. A method for operating an internal combustion engine having at least one combustion chamber, means for forming a combustible air/fuel mixture within the combustion chamber, means for detecting the luminosity within the combustion chamber, generating a curve based on the detected luminosity, determining at least the location of peak luminosity on the luminosity curve, determining the time in the combustion cycle at which peak heat release rate occurs, and predicting $NO_x$ emissions based on the relationship between the location of peak luminosity and the time in the combustion cycle at which peak heat release rate occurs.

5. A method for operating an internal combustion engine as recited in claim 4, wherein at least location of peak luminosity on the luminosity curve is determined in relation to crank angle.

6. A method for operating an internal combustion engine having at least one combustion chamber, means for forming a combustible air/fuel mixture within the combustion chamber, means for detecting the luminosity within the combustion chamber, generating a curve based on the detected luminosity, determining the location of minimum luminosity derivative on the luminosity curve, and predicting the time in the combustion cycle at which peak heat release rate occurs based on the determined location of minimum luminosity derivative.

* * * * *

UNITED STATES PATENT AND TRADEMARK OFFICE
CERTIFICATE OF CORRECTION

PATENT NO. : 5,099,683
DATED : March 31, 1992
INVENTOR(S) : Remboski, Jr. et al

It is certified that error appears in the above-indentified patent and that said Letters Patent is hereby corrected as shown below:

On the Title page under "Other Publications", line 8, "b." should be --B--.

Column 10, lines 14-15, Claim 3, delete "means for detecting the luminosity within the combustion chamber,".

Signed and Sealed this

Thirty-first Day of August, 1993

Attest:

BRUCE LEHMAN

Attesting Officer        Commissioner of Patents and Trademarks